(12) United States Patent
Porter et al.

(10) Patent No.: US 7,908,383 B2
(45) Date of Patent: *Mar. 15, 2011

(54) METHOD AND APPARATUS FOR PHONE APPLICATION STATE MANAGEMENT MECHANISM

(75) Inventors: Brandon William Porter, Foster City, CA (US); Eckart Walther, Palo Alto, CA (US); Daphne H. Luong, Los Altos, CA (US); E. Castedo Ellerman, Palo Alto, CA (US)

(73) Assignee: TellMe Networks, Inc., Mountain View, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/049,985

(22) Filed: Mar. 17, 2008

(65) Prior Publication Data

US 2008/0313336 A1    Dec. 18, 2008

Related U.S. Application Data

(63) Continuation of application No. 09/592,321, filed on Jun. 13, 2000, now Pat. No. 7,376,740.

(51) Int. Cl.
   *G06F 15/16* (2006.01)
(52) U.S. Cl. ......... 709/227; 709/225; 709/226; 709/202; 709/203; 709/229; 370/351; 370/352; 370/356
(58) Field of Classification Search .......... 709/225–227, 709/202–203, 229; 370/351–352, 356
   See application file for complete search history.

(56) References Cited

U.S. PATENT DOCUMENTS

| 5,694,459 | A | | 12/1997 | Backaus et al. |
| 5,799,063 | A | | 8/1998 | Krane |
| 6,055,573 | A | * | 4/2000 | Gardenswartz et al. ...... 709/224 |
| 6,065,120 | A | | 5/2000 | Laursen et al. |
| 6,092,197 | A | * | 7/2000 | Coueignoux ................ 726/21 |
| 6,154,528 | A | | 11/2000 | Bennett, III et al. |
| 6,185,559 | B1 | * | 2/2001 | Brin et al. ................... 707/758 |
| 6,298,330 | B1 | * | 10/2001 | Gardenswartz et al. ... 705/14.25 |
| 6,324,579 | B1 | | 11/2001 | Bleuse et al. |
| 6,373,836 | B1 | | 4/2002 | Deryugin et al. |
| 6,442,687 | B1 | * | 8/2002 | Savage ......................... 713/156 |
| 6,600,736 | B1 | | 7/2003 | Ball et al. |
| 6,701,366 | B1 | | 3/2004 | Kallas et al. |

(Continued)

OTHER PUBLICATIONS

"Microsoft Passport Business Services: Frequently Asked Questions for Businesses," Microsoft Corp., copyright 1999-2000, 4 pages.

(Continued)

*Primary Examiner* — Alina N. Boutah
(74) *Attorney, Agent, or Firm* — Perkins Coie LLP

(57) ABSTRACT

A phone application state management mechanism is described. The mechanism adopts the state storage format widely known as "Cookies" to store information in a cross-application standard format. Cookies for multiple users are stored on a single machine that retrieves phone applications using a hypertext transfer protocol (HTTP). Suitable state information for a particular user is automatically retrieved in connection with HTTP requests. Further, by phone based applications can set the values of suitable cookies. An enforced access policy can be used to prevent an application provided by a first legal entity from accessing state information stored by an application provided by another legal entity. The approach can also be used to reduce the passing of telephone identifying information between applications for user identification purposes.

17 Claims, 3 Drawing Sheets

U.S. PATENT DOCUMENTS

| | | | |
|---|---|---|---|
| 6,707,811 B2 | 3/2004 | Greenberg et al. | |
| 6,757,740 B1* | 6/2004 | Parekh et al. | 709/245 |
| 6,778,653 B1 | 8/2004 | Kallas et al. | |
| 6,792,399 B1* | 9/2004 | Phillips et al. | 705/36 R |
| 6,807,574 B1 | 10/2004 | Partovi et al. | |
| 6,868,389 B1* | 3/2005 | Wilkins et al. | 705/10 |
| 6,871,220 B1* | 3/2005 | Rajan et al. | 709/218 |
| 6,892,307 B1* | 5/2005 | Wood et al. | 726/8 |
| 6,963,848 B1* | 11/2005 | Brinkerhoff | 705/10 |
| 7,051,243 B2 | 5/2006 | Helgren et al. | |
| 7,062,561 B1* | 6/2006 | Reisman | 709/227 |
| 7,089,310 B1 | 8/2006 | Ellerman et al. | |
| 7,216,361 B1* | 5/2007 | Roskind et al. | 726/9 |
| 7,376,586 B1 | 5/2008 | Partovi et al. | |
| 7,376,740 B1 | 5/2008 | Porter et al. | |
| 7,421,486 B1* | 9/2008 | Parupudi et al. | 709/223 |
| 7,552,190 B1* | 6/2009 | Freishtat et al. | 709/217 |
| 2002/0004754 A1* | 1/2002 | Gardenswartz et al. | 705/26 |
| 2003/0005163 A1 | 1/2003 | Belzile | |
| 2003/0021259 A1 | 1/2003 | Miloslavsky et al. | |
| 2004/0139349 A1 | 7/2004 | Henn et al. | |

OTHER PUBLICATIONS

"Microsoft Passport Business Services: Implementation Overview," Microsoft Corp., copyright 1999-2000, 4 pages.

"Nuance 6," product description, Nuance Communications, Menlo Park, CA, 1999, 2 pages.

"Nuance Developer's Toolkit," Nuance Communications, Menlo Park, CA, 1998, 2 pages.

"Voice Extensible Markup Language (VoiceXML)-Technical Background," VoiceXML Forum, copyright AT&T, 1999, 3 pages.

"Voice Extensible Markup Language-VoiceXML," VoiceXML Forum, Version 0.9, Aug. 17, 1999, pp. 1-63.

"VoxML 1.0 Application Development Guide, Revision 1.0," Motorola, Inc., Sep. 1998, pp. 1-31.

"VoxML 1.0 Language Reference, Revision 1.0a," Motorola, Inc., Oct. 1998, pp. 1-51.

"VoxML SDK 1.0a Interim Release Notes," Motorola VoxML Team, Motorola, Inc., Dec. 23, 1998, 5 pages.

Abrams, Mark et al., "UIML: an appliance-independent XML user interface language," Computer Networks, vol. 31, 1999, pp. 1695-1708.

Cover, Robin, "The SGML/XML Web Page—SpeechML," Aug. 17, 1999. 2 pages.

Cover, Robin, "The SGML/XML Web Page-VoxML Markup Language," Mar. 2, 1999, 3 pages.

Daswani, D. et al., "A generalized wallet architecture," In proceedings of the 3rd USENIX Workshop on Electronic Commerce, 1998.

James, Frankie, "AHA: audio HTML access," Computer Networks and ISDN Systems vol. 29, 1997, pp. 1395-1404.

James, Frankie, "Lessons from Developing Audio HTML Interfaces," Proceedings of The Third International ACM Conference on Assistive Technologies (ASSETS '98), Apr. 15-17, 1998, pp. 27-34.

Kristol, D. et al., "HTTP State Management Mechanism," Bell Laboratories, Lucent Technologies, RFC 2109, Feb. 1997, pp. 1-19.

Kristol, David, "HTTP Proxy State Management Mechanism," Bell Laboraties, Lucent Technology, Nov. 26, 1998, pp. 1-19.

Ladd, Eric et al., "Using HTML 4, XML, and Java 1.2," Dec. 23, 1998 Que Chap. 40.

Lemay, Laura et al., "Teach Yourself Java 2 Platform in 21 Days," Jan. 1, 1999, Professional Reference Edition, Chapter 13.

Raman, T.V., "Cascaded speech style sheets," Computer Networks and ISDN Systems, vol. 29. Sep. 1997, pp. 1377-1383.

Schmandt, Chris et al., "Augmenting a Window System with Speech Input," IEEE, Aug. 1990, pp. 50-55.

* cited by examiner

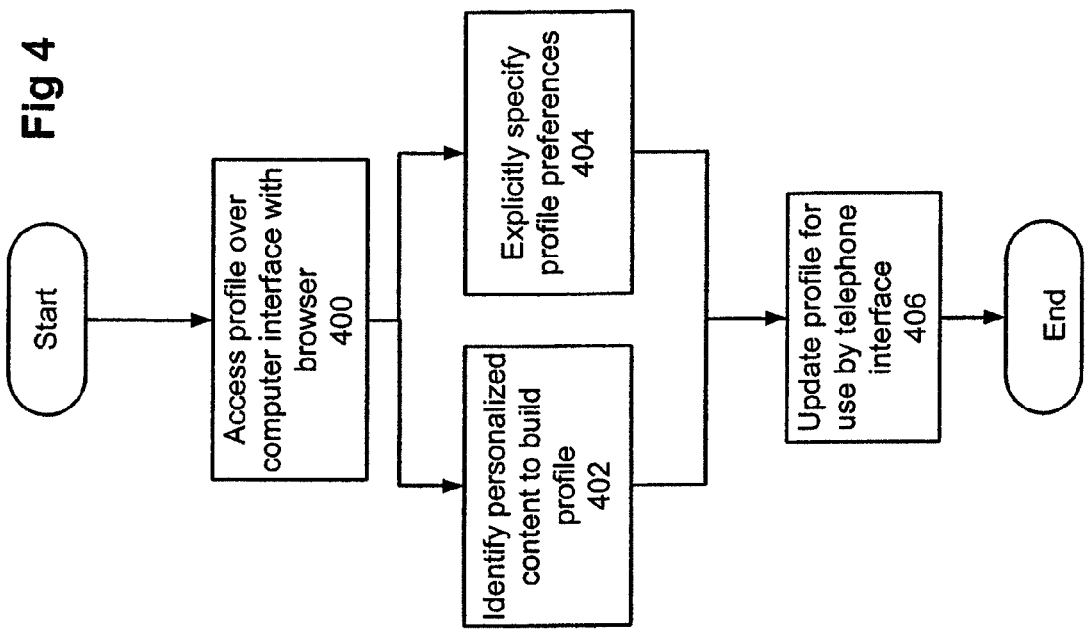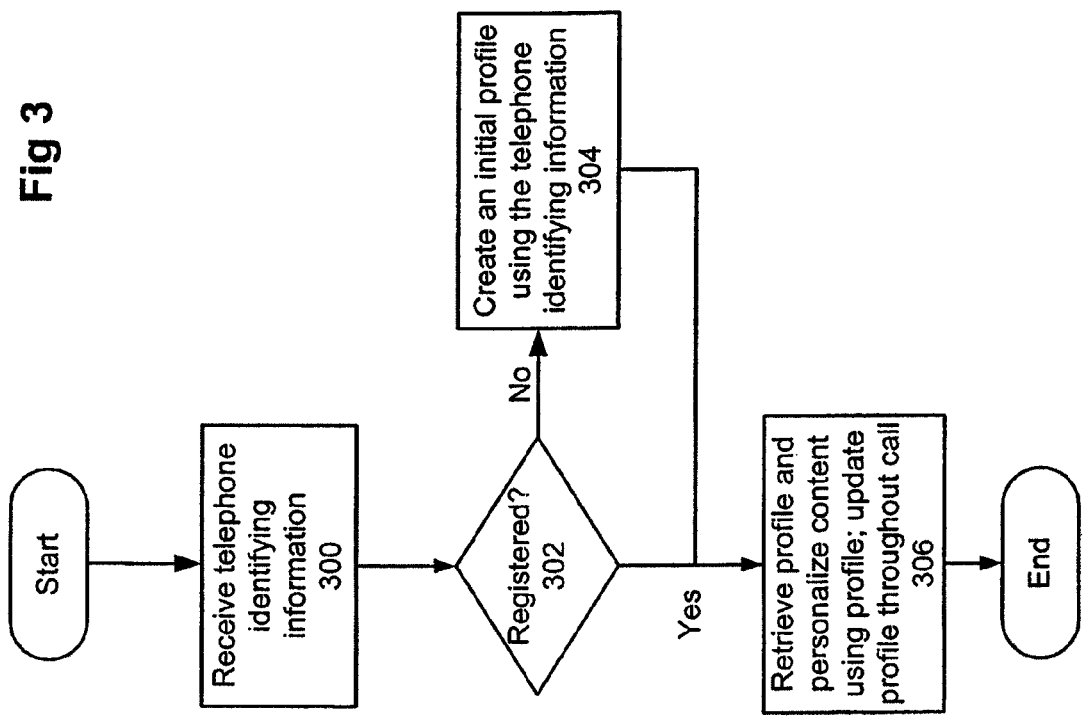

METHOD AND APPARATUS FOR PHONE APPLICATION STATE MANAGEMENT MECHANISM

CROSS REFERENCE TO RELATED APPLICATIONS

This application is a continuation of U.S. application Ser. No. 09/592,321, filed Jun. 13, 2000, titled "METHOD AND APPARATUS FOR PHONE APPLICATION STATE MANAGEMENT," which is incorporated herein by reference in its entirety.

TABLE OF CONTENTS

METHOD AND APPARATUS FOR PHONE APPLICATION STATE MANAGEMENT MECHANISM
TABLE OF CONTENTS
BACKGROUND OF THE INVENTION
   Field of the Invention
   Description of the Related Art
   1. Telephone Identifying Information
   2. Cookies
   3. Storing State In Telephony Applications
SUMMARY OF THE INVENTION
BRIEF DESCRIPTION OF THE FIGURES
DETAILED DESCRIPTION
   A. Introduction
   B. Definitions
   1. Telephone Identifying Information
   2. User Profile
   3. Topics and Content
   5. Demographic and Psychographic Profiles
   C. Voice Portal Overview
   1. Hardware and Software Architecture
   2. Telephone Driven Profile Building
   3. Web Driven Profile Building
   4. Profile Building Via Other Web Sites
   D. Phone Application State Management Mechanism
   Example 1: Existing Web Application
   Example 2: Newly Developed Applications
   How Identified is the User?
   E. Conclusion
CLAIMS
ABSTRACT

BACKGROUND OF THE INVENTION

1. Field of the Invention

This invention relates to the field of electronic commerce. In particular, the invention relates to technologies for managing state in telephone applications.

2. Description of the Related Art

The following describes various techniques used in telephone systems to provide enhanced user features. First, telephone identifying information will be discussed. Many telephone systems that support enhanced user features use telephone identifying information as a basic component.

1. Telephone Identifying Information

The advent of automatic number identification (ANI) and calling number identification (CNID, CLID, or CID) within the North American Numbering Plan (NANP) has supported the creation of a number of services that use these pieces of telephone identifying information. Comparable systems may be used in other numbering plans and countries to support similar services.

For example, when consumers receive credit cards in the mail, they have to call from their home telephone numbers to activate the cards. This is a typical use of ANI. In this instance, the credit card company matches the ANI information provided when the consumer calls to a previously provided telephone number. If the ANI matches the credit card company's records, the credit card company activates the card.

2. Cookies

Cookies are the colloquial term for the "HTTP State Management Mechanism" that as more fully defined in the Internet Engineering Task Force (IETF) Request For Comment (RFC) 2109.

In a similar vein, a modified standard is being developed for proxy state management. See "HTTP Proxy State Management Mechanism" draft proposal to the IETF.

3. Storing State in Telephony Applications

Previous techniques have identified and personalized a user's phone experience through ANI, or other phone-specific device identification information, e.g. telephone identifying information. Alternatively, or in some cases additionally, an explicit user identifier and/or password had to be provided to the application. Then, the individual applications could maintain appropriate state information keyed to that ANI, or user identifier. The state information itself was stored in an application specific, e.g. proprietary, format.

Previous techniques do not preserve privacy of user information if multiple phone applications from different legal entities are provided. Previous techniques do not provide a uniform programming interface for developers of phone applications to store state information. Previous techniques do not provide transparent and persistent access to stored state information. Previous techniques do not allow existing web-based applications to be ported to phone applications that share a common back end and state management mechanism.

Accordingly, what is needed is a method and apparatus for providing state management for telephone applications that can operate in environments with applications provided by multiple legal entities and support multiple users from a single telephone and multiple telephones for a given user, provide a transparent and persistent state management mechanism, and provide easy porting of web based applications to telephone applications.

SUMMARY OF THE INVENTION

A phone application state management mechanism is described. The mechanism adopts the state storage format widely known as "Cookies" to store information in a cross-application standard format. Cookies for multiple users are stored on a single machine that retrieves phone applications using a hypertext transfer protocol (HTTP). Suitable state information for a particular user is automatically retrieved in connection with HTTP requests. Further, phone based applications can set the values of suitable cookies. An enforced access policy can be used to prevent an application provided by a first legal entity from accessing state information stored by an application provided by another legal entity. The approach can also be used to reduce the passing of telephone identifying information between applications for user identification purposes. Further, as compared to identification using telephone identifying information alone, this approach more flexibly handles multiple telephones for a single user and multiple users sharing a single telephone.

The phone state management mechanism preserves user privacy by limiting access by different legal entities to the saved state information, and thus personal information, provided by the user to one entity. The mechanism provides a uniform, transparent and persistent approach for application programmers to preserve state information for phone applications. Additionally, the mechanism allows for the rapid porting of web-based HTML applications to phone-based applications in languages such as VoiceXML.

BRIEF DESCRIPTION OF THE FIGURES

FIG. 3 is a process flow diagram supporting personalization and registration of and for users accessing a voice portal over a telephone interface.

FIG. 4 is a process flow diagram for personalizing a voice portal over a web based interface.

DETAILED DESCRIPTION

A. Introduction

Figure 1:
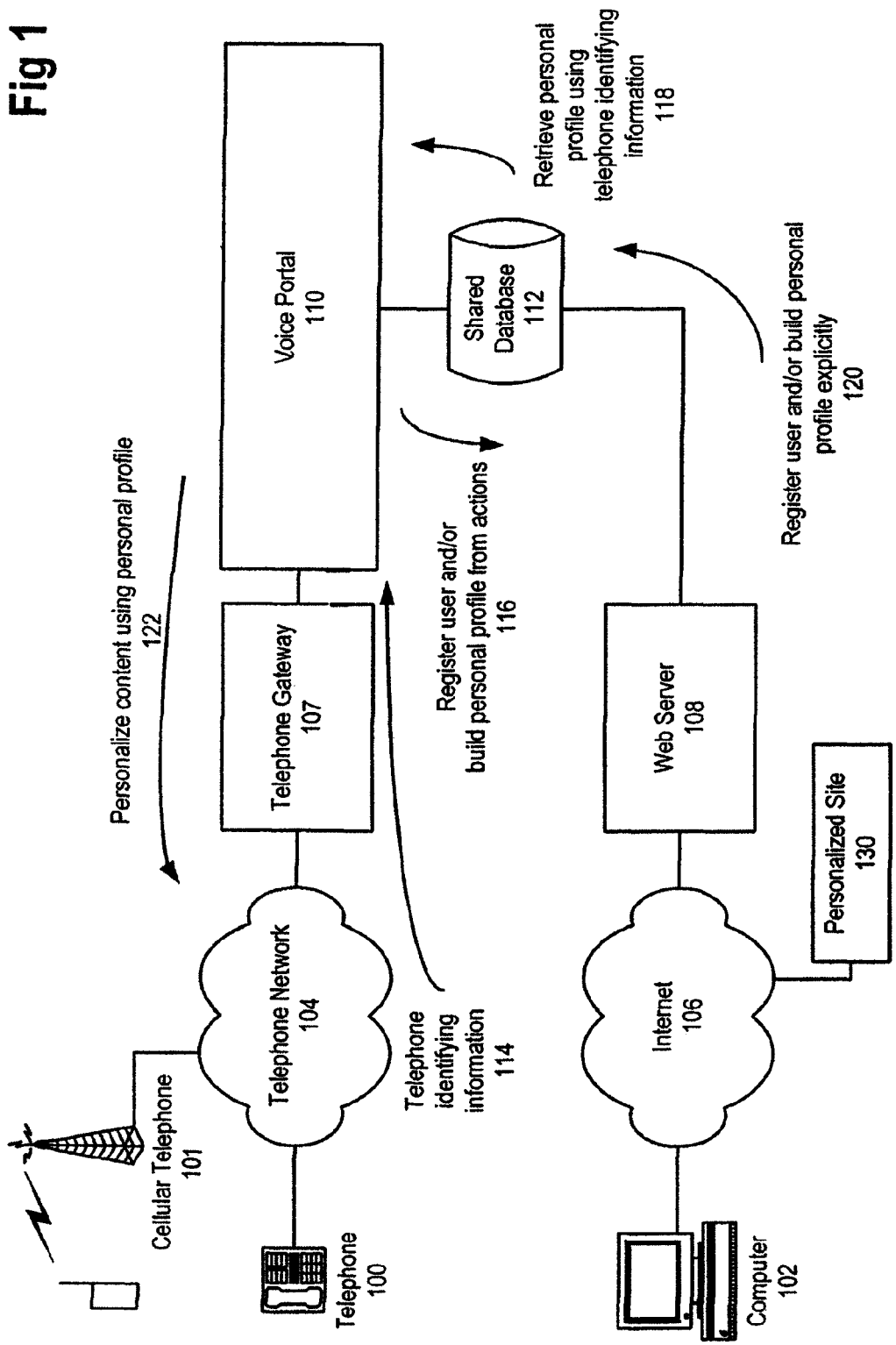
FIG. 1 illustrates a system including embodiments of the invention used to provide personalized content to users of telephones according to telephone identifying information.

A voice portal supporting electronic commerce over a telephone interface is described. The voice portal allows users of telephones, including cellular telephones, to access a voice portal by dialing a phone number to purchase goods and services and interact with applications. The information provided over the voice portal may come from the World Wide Web (WWW), databases, third parties, and/or other sources.

The term voice portal refers to the capability of various embodiments of the invention to provide commerce capabilities over a telephone interface to a caller. The voice portal can receive dual-tone multi-frequency (DTMF or touch-tone) commands as well as spoken commands to further control the content presented and direct commerce transactions as well as the manner of presentation. The term audio request, or input, is used to refer to either a voice or touch-tone input, or a combination of the two types of input.

Embodiments of the invention use telephone identifying information to personalize caller interactions with the voice portal. This allows the system to present highly customized information to each caller based on a personal profile the system associates with the telephone identifying information.

Additionally, since a single user can access the voice portal from a number of telephones, embodiments of the invention may construct user profiles that allow the telephone identifying information from multiple telephones to be associated with a single user profile.

Further, embodiments of the invention allow applications provided by multiple legal entities can to provide services to users via phone applications hosted on, or through, the voice portal while allowing state information to be stored on a per-user profile basis. Further, embodiments of the invention limit access by an application provided by a first legal entity to access the stored state information set by an application provided by a second legal entity. These features (1) protect user privacy by reducing the need to pass the telephone identifying information among different legal entities; (2) segregate the information a user provides to one legal entity from information provided to another legal entity, e.g. state information provided to Co1 does not get presented to Co2 and vice-versa; and (3) provide for a uniform interface for application programmers to store state information in their voice portal applications.

The invention will be described in greater detail as follows. First, a number of definitions useful to understanding the invention are presented. Then, the hardware and software architecture for one embodiment of a voice portal presented. Next, the phone application state management mechanism is described in greater detail. Finally, uses of embodiments of the invention in a voice portal are described in greater detail including electronic commerce features.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information as shown and described more fully in connection with FIGS. 3 and 4. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Cookie

The term cookie, as used herein, refers to a structured data element formatted according to the general principles of IETF RFC 2109 and/or some other state management standard.

A brief review of RFC 2109 may be useful. The core structure of a cookie is a name-value pair. The name is a token for identifying the cookie, e.g. "Customer", and the value is the value of that corresponding token, e.g. "Jane Doe".

Implicitly, each cookie is associated with the sending domain. According to RFC 2109, the implicitly set domain is the originating domain to which the HTTP request was sent. For example, if an HTTP GET request is sent to the request host "www.example.com", then the cookie set in response to that request would be implicitly associated with "www.example.com"

Additionally, a number of optional fields can be set, for example: a different domain for which the cookie is valid (Domain); a time to live (Max-Age); a version string (Version); etc. The phrases in parenthesis correspond to the RFC 2109 standard field names for the options.

5. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

C. Voice Portal Overview

1. Hardware and Software Architecture

First, the hardware and software architecture of a system including an embodiment of the invention will be described with reference to FIGS. 1-2. FIG. 1 illustrates a system including embodiments of the invention used to provide personalized content to users of telephones according to telephone identifying information. The system of FIG. 1 can be used to allow users of standard telephones and cellular telephones to access a voice portal with personalized content from their telephones.

The following lists the elements of FIG. 1 and describes their interconnections. FIG. 1 includes a telephone 100, a cellular telephone 101, a computer 102, a telephone network 104, an Internet 106, a telephone gateway 107, a web server 108, a voice portal 110, a shared database 112 and a personalized site 130. The cellular telephone 101 and the telephone 100 are coupled in communication with the telephone network 104. The telephone network 104 is coupled in communication with the telephone gateway 107. The telephone gateway 107 is coupled in communication with the voice portal 110. The computer 102 is coupled in communication with the Internet 106. The Internet 106 is coupled in communication with the web server 108. The voice portal 110 and the web server 108 are coupled in communication with the shared database 112. The personalized site 130 is coupled in communication with the Internet 106.

The following describes each of the elements of FIG. 1 in greater detail. The use of each of the elements will be described further in conjunction with the sections describing the personalization features.

The telephone 100 and the cellular telephone 101 are two different telephone interfaces to the voice portal 110. The telephone 100 and the cellular telephone 101 may be any sort of telephone and/or cellular telephone. For example the telephone 100 or the cellular telephone 101 may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network (PSTN) and/or some other type of telephone network. For example, some embodiments of the invention may allow users with a voice over Internet Protocol (IP) phone to access the voice portal 110. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g. by a dial-up connection, a digital subscriber loop (DSL), a cable modem, and/or some other type of connection. This allows the computer 102 to communicate with the web server 108. The computer 102 typically provides a visual interface to the WWW and the web server 108 using web browsing software such as Internet Explorer™ from Microsoft Corporation, Redmond, Wash.

Both the web server 108 and the voice portal 110 are capable of communicating with the shared database 112 to register users, build personal profiles implicitly and/or explicitly as will be described more fully below. The database 112 stores profiles for each user based on an association between one or more pieces of telephone identifying information and a particular user. Thus, the database may have a profile for a user Sarah Smith that is keyed to her home telephone number, e.g. 650-493-####. Additionally, Sarah could associate other numbers, e.g. work, cellular, etc., with her profile either implicitly, e.g. by repeatedly calling the voice portal 110 from those numbers, or explicitly, e.g. by adding those numbers to the system directly.

In some embodiments, an existing profile for a web-based portal is adapted for use by the voice portal 110 by associating one or more telephone numbers with the existing profile as stored in the shared database 112. In these embodiments, the existing profile may be further modified for use with the voice portal 110 to allow for different preferences between the web and the voice interfaces.

The call flow arrows 114-122 shown on FIG. 1 will be described in greater detail below.

Figure 2:
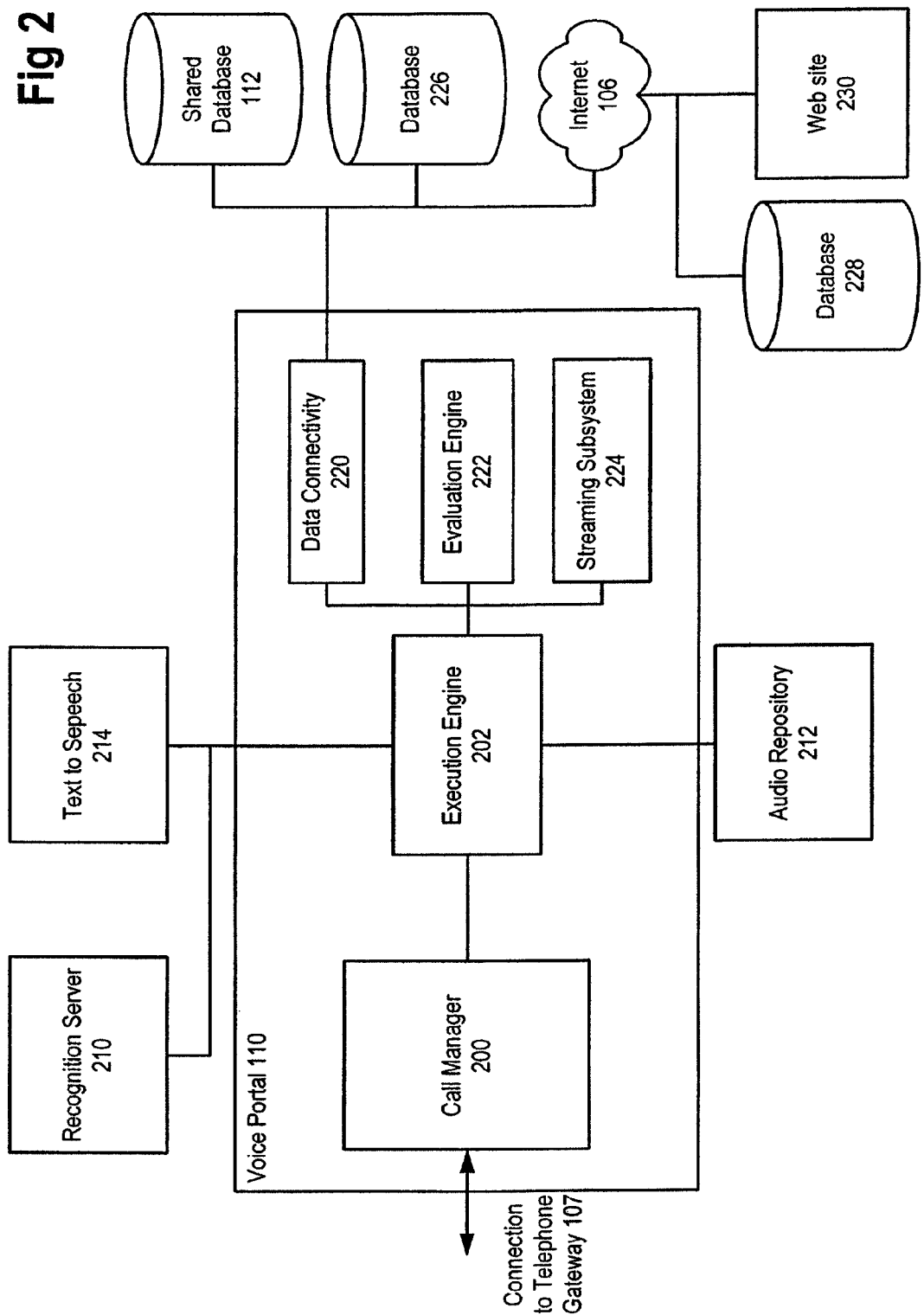
FIG. 2 illustrates the components of a voice portal supporting personalized content.

FIG. 2 illustrates the components of a voice portal supporting personalized content. This could be used to support the voice portal 110 and provide personal content as described above.

The following lists the elements of FIG. 2 and describes their interconnections. The voice portal 110 is coupled in communication with the telephone gateway 107. The voice portal 110 includes a call manager 200, an execution engine 202, a data connectivity engine 220, an evaluation engine 222 and a streaming engine 224. Additionally FIG. 2 includes elements that may be included in the voice portal 110, or which may be separate from, but coupled to, the voice portal 110. Thus FIG. 2 also includes a recognition server 210, a text to speech server 214, an audio repository 212, the shared database 112, a database 226, the Internet 106, a database 228 and a web site 230. The call manager 200 within the voice portal 110 is coupled to the execution engine 202. The execution engine 202 is coupled to the recognition server 210, the text to speech server 214, the audio repository 212, data connectivity engine 220, the evaluation engine 222 and the streaming engine 224. The data connectivity engine 220 is coupled in communication with the shared database 112, the database 226 and the Internet 106. The Internet 106 is coupled in communication with database 228 and the web site 230.

The following describes each of the elements of FIG. 2 in greater detail. The use of each of the elements will be described further in conjunction with the sections describing the personalization features.

Typically, the voice portal 110 is implemented using one or more computers. The computers may be server computers such as UNIX workstations, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming subsystem 224, the audio repository 212, the text to speech 214 and/or the recognition engine 210.

The call manager 200 is responsible for scheduling call and process flow among the various components of the voice portal 110. The call manager 200 sequences access to the execution engine 202. Similarly, the execution engine 202 handles access to the recognition server 210, the text to speech server 214, the audio repository 212, the data connectivity engine 220, the evaluation engine 222 and the streaming engine 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier™ and/or other voice login and verification products.

The text to speech server 214 supports the conversion of text to synthesized speech for transmission over the telephone gateway 107. For example, the execution engine 202 could request that the phrase, "The temperature in Palo Alto, Calif., is currently 58 degrees and rising" be spoken to a caller. That phrase would be translated to speech by the text to speech server 214 for playback over the telephone network on the telephone (e.g. the telephone 100). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request play-back of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing.

The execution engine 202 supports the execution of multiple threads with each thread operating one or more applications for a particular call to the voice portal 110. Thus, for example, if the user has called in to the voice portal 110, a thread may be started to provide her/him a voice interface to the system and for accessing other options.

In some embodiments of the invention an extensible markup language (XML)-style language is used to program applications. Each application is then written in the XML-style language and executed in a thread on the execution engine 202. In some embodiments, an XML-style language such as VoiceXML from the VoiceXML Forum, <http://www.voicexml.org/>, is extended for use by the execution engine 202 in the voice portal 110.

Additionally, the execution engine 202 may access the data connectivity engine 220 for access to databases and web sites (e.g. the shared database 112, the web site 230), the evaluation engine 222 for computing tasks and the streaming engine 224 for presentation of streaming media and audio. The streaming engine 224 may allow users of the voice portal 110 to access streaming audio content, or the audio portion of streaming video content, over the telephone interface. For example, a streaming media broadcast from ZDNet™ could be accessed by the streaming engine 224 for playback through the voice portal.

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases (ODBC), and/or other types of databases. The shared database 112 is represented separately from the other databases in FIG. 2; however, the shared database 112 may in fact be part of one of the other databases, e.g. the database 226. Thus, the shared database 112 is distinguished from other databases accessed by the voice portal 110 in that it contains user profile information.

Having described the hardware and software architecture supporting various embodiments of the invention, the various personalization features provided by different embodiments of the invention will now be described.

2. Telephone Driven Profile Building

Turning to FIG. 3, the process of creating a profile using a telephone interface will be described. This process will be described with reference to the call flow arrows shown on FIG. 1 as well.

The voice portal 110 is able to flexibly handle multiple callers from a single telephone, e.g. Tom and Dick are roommates and both call from 650-493-####. Similarly, the voice portal 110 is able to handle a single caller that uses multiple telephones, e.g. Tom has a cell phone 650-245-####, his home phone 650-493-####, and a work phone 408-301-####. The manner in which the voice portal 110 can handle some of the above situations will be discussed throughout. In the example used while describing FIG. 3, the process will be described using a caller Jane Smith as an exemplary caller who has never registered with the voice portal 110 from any telephone and an exemplary caller John Doe who has previously called the voice portal 110 from his telephone 100.

First, at step 300, telephone identifying information is received. This is shown in FIG. 1 by call flow arrow 114 representing the transfer of telephone identifying information through the telephone gateway 107 to the voice portal 110. This step occurs after a user has placed a call to the voice portal 110 with a telephone, e.g. the telephone 100.

Next, at step 302, a determination is made as to whether the telephone identifying information corresponds to a known profile, e.g. is the user registered? Some examples may be illustrative. If Jane Smith uses the cellular telephone 101 to call the voice portal 110 for the first time, her telephone identifying information will not be associated with any existing unique profile in the shared database 112. Therefore, at step 302, the determination would be made that she is not registered and the process would continue at step 304. In contrast, John Doe has previously called the voice portal from the telephone 100 and so his telephone identifying information will be associated with a profile in the shared database 112 and the process would continue at step 306.

If, the telephone identifying information is not associated with an existing profile in the shared database 112, a new profile is created at step 304. The new profile may be initialized using a variety of information derived from the telephone identifying information and/or predetermined values for the voice portal 110. Thus, for example, when Jane Smith calls for the first time from the cellular telephone 101, an initial profile can be created using the calling number, e.g. 650-493-####, included in the telephone identifying information to select initial profile settings. The call flow arrow 116 shows this process on FIG. 1. The use of the telephone identifying information to create an initial profile is discussed below in the section "Automatic Profile Initialization".

In some embodiments, the profile is not initialized using the telephone identifying information. In other embodiments, the user may be explicitly queried by the voice portal 110 to create one or more components of the initial profile, e.g. "Please speak your first name", to allow for more personalized prompting by the voice portal 110. Once a profile is created, the process continues at step 306.

At step 306, the profile is retrieved from the shared database 112 as shown by the call flow arrow 118. The profile can be updated throughout the call based on the user's behavior and actions—implicit preferences—as well as explicit requests from the user to customize the voice portal 110. Once a profile is selected at step 306, the personalized content can be presented to the user as shown by the call flow arrow 122 in FIG. 1.

For example, John Doe, who is calling from the telephone 100, already has a profile in the shared database 112. That profile may indicate that John prefers a southern dialect and likes to hear a quick stock market report immediately on call in. Thus, for John, his telephone identifying information serves to log him directly into the system and trigger the personalized behavior unique to him: a quick stock market report in a southern dialect. In contrast, a different caller, Sarah Brown, from a different telephone will be provided different personalized content based on that telephone identifying information.

The voice portal may support multiple callers from a single telephone. For example, Sarah Brown and John Doe may both use the telephone 100 to call the voice portal 110. In the case where two or more profiles are identified with the same telephone identifying information, the voice portal may prompt for a password or other unique identifier, either as voice or touch-tone, to select among the profiles.

However, as a general matter, the voice portal is configured to minimize the need for a caller to provide a password. Thus, during a single call session, the caller is typically only asked to provide her/his password a single time. However, some embodiments of the invention may require that a password always be used to complete commercial transactions and/or after the passage of a predetermined period, e.g. ten minutes since last password prompt. In some embodiments, the user may adjust her/his profile to allow login without a password for playback features.

Also, a single profile can be associated with multiple calling numbers. For example, the user Jane Doe could specify that both the telephone 100 and the cellular telephone 101 should be associated with her profile. Similarly, if Jane calls from a new telephone, e.g. pay phone, she can provide her existing telephone number and her password to access her profile. In some embodiments, whenever the user calls from a new telephone number, she/he is prompted as to whether to remember the number for future use. In some embodiments, additional telephone identifying information, e.g. this is a pay phone, is used so that the caller is not prompted to associated telephone numbers that are likely to be single time uses with her/his profile. Similarly, voice verification may be used to recognize a caller's voice instead of, or in addition to, using a password or other identification number.

Typical events that would require a password, or that the user be authenticated previously with a password, might include adding and removing items from the user profile through explicit commands as well as requests for specific personal information, e.g. that user's stock portfolio, bank account balances, etc.

It is not necessary for callers to the voice portal 110 to explicitly specify their preferences using this embodiment of the invention. The callers' behaviors and actions are used by the voice portal 110 to adopt implicit preferences, sometimes after receiving confirmation. For example, behaviors and actions reflecting repeated access to a content in a particular topic, or a particular topic, may cause the voice portal 110 to automatically include the repeatedly requested content in the default message.

For example, if a caller from New York City repeatedly asks for the weather in San Francisco, the system can add the San Francisco weather to the standard weather report. Alternatively, the system may request confirmation before adding the weather report, e.g. "Would you like me to include San Francisco in the standard weather report?" Similarly, at the level of topics, users who repeatedly ask for information about business related issues may find that the system will adjust the main menu to include business. Similarly, if that same user never asks for sports scores, that option may drop off the main menu. In some embodiments, the system may ask for confirmation before modifying the menu choices, or the system may notify the user of a modification and/or allow a user to review/change past modifications. As a result, the structure and content of the call may change, e.g. San Francisco weather will be announced at the beginning of future calls and sports information may be omitted.

Through the use of this process, the need for a specialized editing mode of the type seen on customizable web portals is reduced. The user's actions and behaviors shape the options presented to her/him. Thus, reducing the need to explicitly pick topics and/or content in an editing mode. However, some embodiments of the invention may allow for explicit profile creation in an editing mode over the web, see below, and/or over the telephone. Also, users are typically permitted to add and remove topics and/or items at will with explicit commands, e.g. "Remember this", "Remove", "Add to my stock list", etc.

3. Web Driven Profile Building

Turning to FIG. 4, the process of modifying a profile for use over a telephone interface over the web will be described. This process will be described with reference to the call flow arrows shown on FIG. 1 as well.

The process shown in FIG. 4 assumes that a profile has already been created, e.g. by calling for the first time as described above. However, in some embodiments of the invention, users may create profiles using the web interface by providing the telephone identifying information for their primary calling phone number and a password. As is the case with the telephone registration process described in step 304, the telephone identifying information provided, here the primary calling phone number, can be used to create the initial profile.

Starting at step 400, the profile is accessed using a computer (e.g. the computer 102) via a web interface. The web interface is provided by a web server (e.g. the web server 108) and allows for access to the shared database 112 as shown by the call flow arrow 120.

Once the user has signed in to access her/his profile on the computer, she/he can manually identify content and topics to build her/his profile at step 404. This can be supported by allowing the user to specify topics from a list of topics and then specifying per topic content from a list of content. For example, the topics might include business, sports, news, entertainment, and weather, to name a few. The user could include weather, news, and business in her/his main menu and then further customize the specific content to be presented within those topics. For example, within weather, the user might select the specific cities she/he wants listed in her/his weather menu and/or the cities for which the weather is automatically played.

Alternatively, at step 402, the user can identify a web location with personalized content to use in building her/his profile, e.g. a uniform resource indicator (URI). For example, FIG. 1 includes the personalized site 130. The personalized site 130 could be a customized portal web page, e.g. myYahoo!, My Netscape, etc., a home page the user herself/himself has designed, and/or any other web page that includes content of interest to the user. The user can identify the personalized site with a uniform resource indicator (URI), including a login identifier and password if necessary, e.g. for myYahoo! The personalized site 130 can then be accessed and the pertinent user preferences, e.g. news, stocks, selected. Taking the example of a customized portal site, the main topics selected, e.g. horoscopes, and the content within, Sagittarius, could be adopted. However, the voice portal 110 may present its own content for that particular item, e.g. the version of the Sagittarius horoscope on the voice portal 110 not the version from the personalized site 130.

The processes of step 402 and step 404 can be used together allowing a user to quickly transfer preferences from a web portal to her/his voice portal while still supporting explicit personalization.

Alternatively, in some embodiments of the invention, an existing web portal profile is voice enabled for use by a voice portal through the association of telephone identifying information with the existing web portal. In this embodiment, at step 402, the telephone identifying information, e.g. the primary calling number, is associated with an existing web profile, e.g. myYahoo! profile, stored in the shared database 112 and that existing web profile is then usable from the voice portal 110 either using voice or touch-tone commands.

Additionally, web sites like the personalized site 130 may be accessed using the voice portal 110 in some embodiments of the invention through the use of the data connectivity engine 220 as shown in FIG. 2.

4. Profile Building Via Other Web Sites

Some embodiments of the invention may allow users of the voice portal 110 to add to their profile from other web sites. For example, if a user of the computer 102 is accessing a web site (e.g. the personalized site 130), the web site might include a link like "Add this to your voice portal." Thus, for example, from a service such as MapQuest™ or Ameritrade™, the user could click on a link to add a particular piece of content or a particular topic to their portal for the voice portal 110.

For example, a user could add her/his "QQQ" stock symbol to her/his profile on the voice portal 110 even though the voice portal 110 may be operated independently of the particular web site.

This type of web based profile building allows for widespread profile building for the voice portal 110 from a variety of Internet sites. Also, in some embodiments, the web browser software on the user's computer (e.g. the computer 102) can support an option to add a bookmark to the user's profile stored in the shared database 112 for the voice portal 110. For example, a menu option in the browser on the computer 102 might include "Add Page to Voice Portal Shortcuts" and upon selecting that menu option, the current web page would be added to the user's profile on the voice portal 110.

This would typically be accomplished by accessing a URI on the web server 108 that included the information to be added. At that point, the web server 108 might ask for a primary calling phone number and/or a password. In some embodiments, a cookie stored by the browser on the computer 102 may be used to obviate one or both of these steps. After the user provides the information, or it is accepted automatically, a confirmation page may be shown including a return link to the originating web page. Several example URI's for adding content are shown below:

<http://www.voiceportal.com/add.cgi?topic=stock%20quote&content=QQQ>

<http://www.voiceportal.com/add.cgi?shortcut=MapQuest&ref=www.mapquest.com/voice.vxml>

<http://www.voiceportal.com/add.cgi?shortcut=myYahoo&ref=my.yahoo.com/voice.vxml&login=jdoe>

These examples are illustrative of the various types of URI's that can be placed as links on web sites to allow users of the voice portal 110 to further customize their profile.

D. Phone Application State Management Mechanism

The preceding discussion has focused on a hardware and software architecture for a voice portal and the personalization of content for users accessing such a voice portal (e.g., the voice portal 110). Additionally, applicants note two commonly owned and assigned, co-pending patent applications relating to electronic commerce and personalization as they relate to voice portals:

| Ser. No. | Title | Filing Date |
|---|---|---|
| 09/466,236 | Method and Apparatus for Electronic Commerce Using a Telephone Interface | Dec. 17, 1999 |
| 09/426,102 | Method and Apparatus for Content Personalization over a Telephone Interface | Oct. 22, 1999 |

The above cases include additional disclosure relating to a voice portal. The state mechanism described herein is synergistic with the above disclosures and allows for preservation of state within applications designed for such a portal—and more generally phone applications.

The phone state management mechanism process can be integrated with the process of FIG. 3, e.g. during step 306. For example, if a registered user is identified at step 302, when the user profile is retrieved in step 306, the corresponding state information for that user profile can be accessed as well. Some embodiments of the invention store the state information in the shared database 112 as cookies.

In the case of unregistered users, e.g. they are new callers or are being permitted to use the voice portal "anonymously", a blank—or predetermined—state can be supplied at step 304. In the case of a predetermined state, one or more predetermined cookies can be obtained or computed by the voice portal 110 and placed into the appropriate location, e.g. the shared database 112. If the voice portal 110 is supporting anonymous users, the state information may be purged after an anonymous telephone call ends. For non-anonymous users, the state information can be preserved as saved cookies in the shared database 112 between different telephone calls to the voice portal 110.

According to some embodiments of the invention, the execution engine 202 retrieves applications according to a hypertext transfer protocol (HTTP). This can occur during a call to the voice portal, e.g. during step 306. When HTTP is used to retrieve applications, it is possible to retrieve applications over the Internet 106, e.g. from a web site 230.

The use of HTTP requests also serves as an opportunity for the retrieval of state information about a user by an application. Also, when desired by the application developer, state information can be associated with a user profile when HTTP requests are made.

As noted above, cookies are either implicitly or explicitly associated with a domain. According to IETF RFC 2109, the domain indicates the set of allowable servers that can retrieve/set a particular cookie. However, the voice portal 110 can implement access policies different from a particular state management standard.

Some embodiments of the invention, implement the IETF RFC 2109 procedures for controlling access to cookies according to the domain associated with a cookie and the request host, e.g. the host portion of the uniform resource indicator (URI) for the requested application. Thus, for example, a request for an application at <http://server1.com/app1.vxml> would be able to access cookies with the domain set to server1.com, and other suitable cookies according to the particular access policy being implemented. In contrast, according to some embodiments of the invention, the same application, <http://server1.com/app1.vxml>, would not be permitted to access cookies with the domain set to server2.com.

Similar restrictions, if desirable, can be imposed on what cookies can be set by a particular application. The operator of the voice portal 110 can select a policy on cookies not set by their originating server. For example, the above example application, <http://server1.com/app1.vxml>, might attempt to set a cookie for a different domain, e.g. "advertiser.com". The decision as to whether to allow such state storage requests to succeed can be made on a voice portal-wide basis, on a case by case basis by one or more of the operator of the voice portal (e.g. on a per company basis) and/or by the users of the voice portal (e.g. based on user feedback or a preference set either over the phone or on the web).

The details of the particular state management access policy that is selected for a particular voice portal (e.g. the voice portal 110) is therefore largely dependent on the particular needs of the applications on that portal, the decisions made by the operator(s) of that voice portal, and decisions made by users of that voice portal. The policies can be adjusted as needed.

The default policy according to some embodiments of the invention follows the industry standard practices for implementing IETF RFC 2109 so that the operation of the voice portal 110 conforms with the implementation provided by major browsers such as Microsoft™ Internet Explorer™ and Netscape Navigator™.

It is important to emphasize that any given instantiation of a phone application can only access the then current user's state information. Thus, if two users Jane and John have separate user profiles, when an application is responding to requests for John, only his state information can be retrieved and set. The voice portal 110 is responsible for preventing access to state information relating to Jane's user profile.

Where appropriate, a web based interface, such as the interface described in FIG. 4, can be used to allow individual users to manage the state information associated with their user profile, e.g. delete, review, etc. Some embodiments of the invention do not allow a user to block, or refuse, all cookies as such a refusal might prevent the orderly function of one or more applications. However, other policy decisions about cookies may be afforded the user, e.g. refuse cookies not returned to originating server, etc.

Additionally, the voice portal 110 can handle the expiration, or removal, of outdated cookies. Many cookies are designed to expire at the end of the current session. Various embodiments of the invention define a session differently. For example, some embodiments of the invention treat a session as a single telephone call. Other embodiments treat a session as all telephone calls received during a predetermined period. For cookies with an explicitly set expiration time, the voice portal 110 can honor that setting. Some applications of embodiments of the invention will now be considered.

Example 1

Existing Web Application

Usage of the state information in a remotely hosted telephone application for the electronic commerce vendor Vendor will be considered. The application is hosted on "http://phone.vendor.com/" and the voice portal 110 will be located at "http://www.voiceportal.com/" in this example. Vendor already has a web based application using HTML set up to allow electronic commerce at their web site, <http://www.vendor.com/>. The web based application uses cookies, e.g. the RFC 2109 HTTP state management mechanism, to manage and store state with standard web browsers such as Microsoft™ Internet Explorer™.

Vendor would like to host its application on the voice portal 110 to allow phone based customers access to its electronic commerce services. According to some embodiments of the invention, Vendor can re-write the customer facing portions of its web site, e.g. the HTML content and forms, in one more phone application languages including VoiceXML, and variant and extended forms of VoiceXML. Notably, the application programmers preparing the phone application can leverage Vendor's existing backend processing mechanism provided that the application uses the standard HTML state management mechanism to monitor and track state.

Example 2

Newly Developed Applications

Application programmers developing new phone applications can freely store and retrieve state information within and across sessions. For example, if the application programmer wants to record the user's preferred traffic city, she can set a cookie, e.g. "Preferred City" to the appropriate value, e.g. "Palo Alto, Calif.". On subsequent invocations of the application, when the HTTP GET request to retrieve the weather application is made, the appropriate state information will be retrieved automatically and provided to the application.

However, this particular state management approach is complimentary to the existing profile access and maintenance mechanisms available to suitably privileged applications. Thus, for example the application programmer might instead simply access the user profile within the application to retrieve the city, state, etc. According to some embodiments of the invention user profiles can only be accessed by a subclass of applications authorized by the operator of the voice portal 110. Accordingly, programmers are not guaranteed access to the user profile—this preserves user privacy since user profile information cannot be accessed by third party applications except when authorized by the operator of the voice portal.

How Identified is the User?

Some embodiments of the invention track different levels of confidence indicating the extent to which a user has been fully identified. For example, if multiple members of a household use the service with different profiles, it may be difficult to immediately select the appropriate profile.

Some embodiments of the invention track this as an identification level selected from the set:

Unknown: The system could not obtain telephone identifying information or was unable to process telephone identifying information appropriately. At this level, persistent cookies are unavailable and will be deleted at the end of the session.

Anonymous: The system could not identify a unique user from the telephone identifying information, e.g. multiple users may share this phone. At this level, persistent cookies are unavailable and will be deleted at the end of session.

Identified: The system has identified a single user profile using only the telephone identifying information-however no password has been received. Persistent cookies are made available. Also, user profile information may be accessed from within the application through appropriate variables, e.g. {user.*}.

Verified: The system has identified a single user profile and confirmed the identity, e.g. with a password, voice login, and/or other authentication method. Persistent cookies are made available. Also, user profile information may be accessed as for identified users.

The specific user level can be made known to the remote application in a number of different fashions. For example, the integers 0 through 3 can correspond to each of the above levels and be stored in a session variable, e.g. {session.id_level}, available to all applications.

A variety of implementation specific choices can then be made on a platform wide and on a per-application basis. For example, according to some embodiments of the invention, applications are not provided state information for a particular user unless the confidence exceeds a predetermined threshold, e.g. identified or verified.

In this situation, a temporary profile can be created to hold state during a particular telephone call. Alternatively, the caller can be asked to better identify herself/himself to the system. Still other embodiments allow applications to decide whether to request further authentication, e.g. the particular phone application could request that a user be verified, etc.

The confidence information could also be provided in the form of a designated cookie having appropriate access rights for applications, e.g. "Confidence=<value>", in a request header, and/or in a suitable programming language construct.

E. Conclusion

A phone state management mechanism has been described that is privacy preserving for users (e.g. different legal entities cannot access the saved state information of another entity except as allowed by the cookie access policy and telephone identifying information is kept confidential to the voice portal 110); is uniform for application developers (a single state management mechanism is available for phone application development); provides transparent storage and persistence of state information (e.g. state information can survive from one telephone call to the next and application developer does not need to be aware of the storage mechanism); allows leverage of web based applications (e.g., suitable phone applications can interact with existing back end of web applications through the use of a shared state format).

The phone state management mechanism can be integrated with personalization features provided by embodiments of the invention have been described, those features can be combined in a number of ways to provide personalized commerce services.

In some embodiments, voice portal 110 can be hardware based, software based, or a combination of the two. In some embodiments, voice portal 110 and/or the phone application state management mechanism are comprised of one or more computer programs that are included in one or more computer usable media such as CD-ROMs, floppy disks, or other media. In some embodiments, call manager programs, execution engine programs, data connectivity engine programs, evaluation engine programs, streaming subsystem programs, recognition server programs, text to speech programs and/or phone application state management mechanisms are included in one or more computer usable media.

Some embodiments of the invention are included in an electromagnetic wave form. The electromagnetic waveform comprises information such as call manager programs, execution engine programs, data connectivity engine programs, evaluation engine programs, streaming subsystem programs, recognition server programs, text to speech programs and/or phone application state management mechanisms. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of using a telephone identifying information to preserve state for an application over a telephone interface using a first computer, the method comprising:
    identifying a user profile using the first computer and the telephone identifying information associated with a request received at the first computer to access the application;
    selecting a state associated with the user profile using the first computer, the state comprising a cookie;
    determining a confidence level with which a user can be identified using the user profile;
    persistently storing the cookie at the first computer when the confidence level reaches a predetermined level;
    providing, by the first computer, the cookie to the application hosted remotely from the first computer.

2. The method of claim 1, further comprising, initiating the application by retrieving the application using a HTTP request and including in the HTTP request at least one "Cookie:" header corresponding to the cookie.

3. The method of claim 1, wherein the application has a corresponding uniform resource indicator (URI) and wherein the cookie is selected according to applicability to the URI.

4. The method of claim 3, wherein the applicability of the cookie for inclusion in the subset is determined according to IETF RFC 2109.

5. The method of claim 3, wherein the applicability of the cookie for inclusion in the subset is determined according to policies in a state management standard.

6. The method of claim 1, further comprising storing a new cookie, the new cookie received from the application as part of a hypertext transfer protocol (HTTP) request for a uniform resource indicator (URI).

7. The method of claim 6, wherein the storing occurs responsive to verification of the new cookie by the first computer according to IETF RFC 2109.

8. The method of claim 6, wherein the storing occurs responsive to verification of the new cookie by the first computer according to policies in a state management standard.

9. The method of claim 1, further comprising, verifying a password for the user profile received over the telephone interface prior to the selecting.

10. The method of claim 1, further comprising, creating a user profile on the first computer.

11. The method of claim 1, wherein each cookie in the plurality of cookies associated with a corresponding domain, wherein the HTTP request include an HTTP request host and wherein the subset of the plurality of cookies comprises each cookie in the plurality of cookies with a corresponding domain similar to the HTTP request host.

12. The method of claim 1, further comprising, creating a new user profile responsive to receiving telephone identifying information not associated with an existing user profile.

13. The method of claim 1, further comprising, creating a temporary user profile responsive to receiving telephone identifying information not associated with an existing user profile; and
    deleting the temporary user profile upon receiving a signal from the telephone interface signaling an end of a telephone call.

14. An apparatus for preserving state for an application over a telephone interface, the apparatus comprising:
    means for receiving a telephone identifying information over the telephone interface;
    wherein, the telephone identifying information is associated with a request received at a first computer to access the application;
    means for identifying a user profile according to the telephone identifying information;
    means for selecting a state associated with the user profile, the state comprising multiple cookies;
    means for determining a confidence level with which a user can be identified using the user profile;
    means for persistently storing the cookie at the first computer when the confidence level reaches a predetermined level;
    means for providing, at the first computer, a subset of the multiple cookies to the application hosted remotely from the first computer.

15. The apparatus of claim 14, wherein the apparatus supports a second application, the application provided by a first legal entity and the second application provided by a second legal entity.

16. The apparatus of claim 15, wherein the multiple cookies includes a first cookie set by the second application, and wherein the subset of the plurality of cookies does not include the first cookie.

17. A computer system to preserve state for an application over a telephone interface, the computer system comprising:
    a memory device;
    an Internet interface including at least one program for the computer system to access a second computer system over the Internet, wherein, the second computer system includes an application;
    a telephone interface to send and receive audio signals to and from a telephone and to receive a telephone identifying information corresponding to the telephone; and
    a control subsystem to control the Internet interface and the telephone interface, the control subsystem including at least one program for identifying a user profile according to the telephone identifying information, the user profile having a corresponding state, the state comprising a plurality of cookies, determining a confidence level with which a user can be identified using the user profile; persistently storing the cookie at the first computer when the confidence level reaches a predetermined level; and providing a subset of the plurality of cookies over the Internet interface to the second computer system when retrieving the application.

* * * * *